INVENTOR.
THOMAS E. BAN
BY
ATTORNEY.

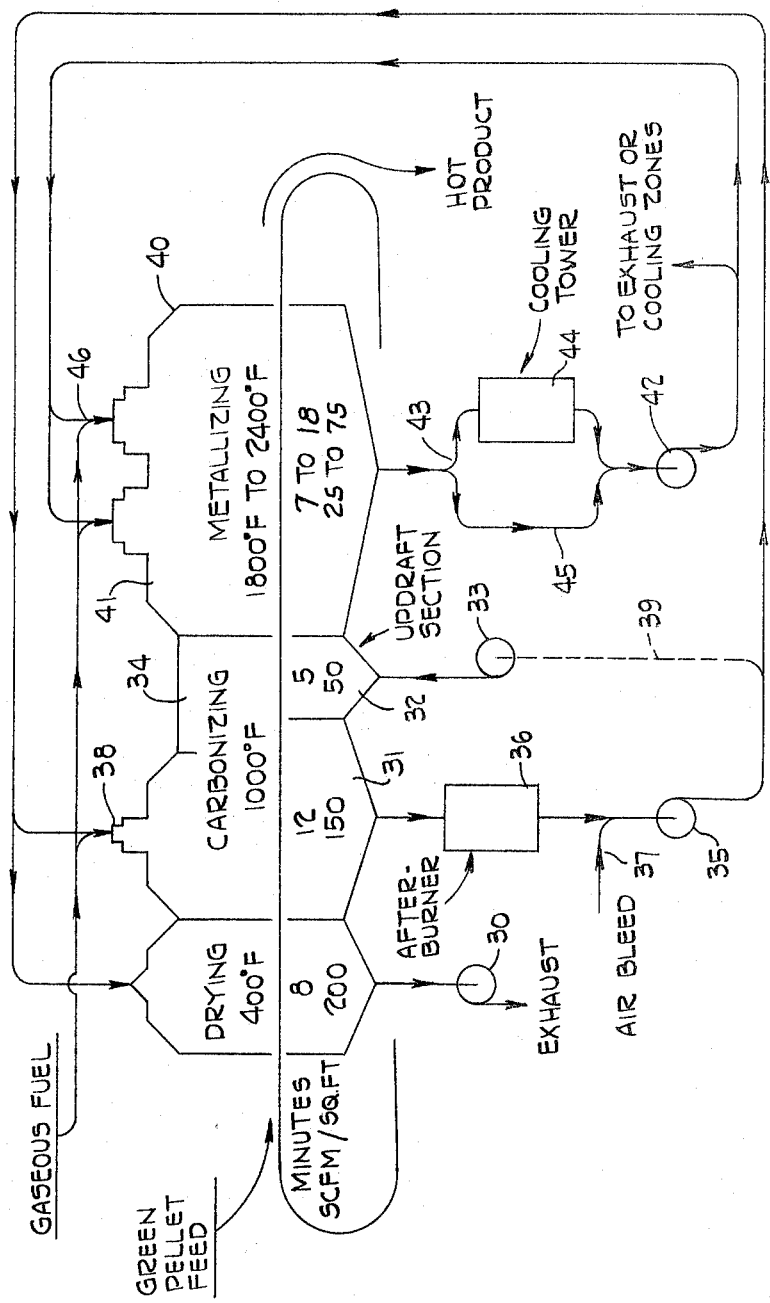

3,264,091
PROCESS FOR PRODUCING HIGHLY
METALLIZED PELLETS
Thomas E. Ban, Cleveland Heights, Ohio, assignor to
McDowell-Wellman Engineering Company, Cleveland,
Ohio, a corporation of Ohio
Filed June 20, 1963, Ser. No. 289,221
7 Claims. (Cl. 75—5)

This invention relates, as indicated, to an improved process and system for the production of highly metallized pellets from pelletized iron ore, which pellets contain a substantial percentage of iron in the metallic or reduced state.

Briefly, this iron making process involves the bringing together of powdered iron ore, powdered carbonaceous material such as powdered coal, and powdered flux, e.g. limestone in predetermined amounts to form an intimate powdered mixture, pelletizing the mixture to form discrete balls, and indurating the mixture with a substantially inert atmosphere on a Dwight-Lloyd traveling grate machine. The highly metallized pellets of the present invention may then be directly smelted to produce pig iron, or they may be cooled and removed to a remote smelting site.

In contradistinction to prior methods of producing partially reduced iron ore pellets by traveling grate machines, the present invention depends upon the utilization of substantially neutral gases for effecting drying, preheating, and metallizing of the pellet materials. Previous processes have utilized air and a carbonaceous material containing tarry or asphaltic components to produce a char-bonded product containing in practical embodiments free metal to the extent of about 20% by weight of the available iron in the metallic state. Such iron, however, is in the form of minute discrete particles visible to the unaided eye. The iron in the pellets produced according to the present improved process fuses under the conditions of treatment and forms a metal bonded pellet of great strength. From 60% to 90% of the available iron in the pellet is reduced to the metallic state. Consequently, in the final smelting process a relatively minor amount of reduction is required to produce pig iron.

The present invention may be better understood by having reference to the annexed drawings which illustrate diagrammatically metallizing processes in accordance herewith.

Figure 3:
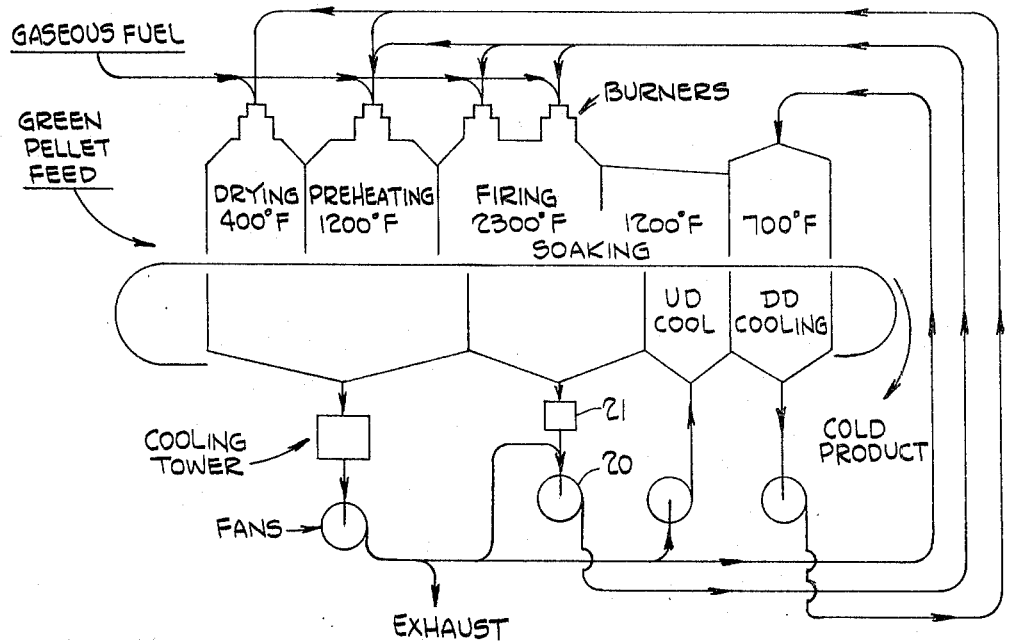

FIG. 3 diagrammatically illustrates the conditions and set up for a conventional traveling grate machine for producing cooled highly metallized pellets.

FIG. 4 is a diagrammatic illustration of a modified system for producing highly metallized pellets.

Briefly stated, then, the present invention is in a process for making metallized pellets including the steps of forming a mixture of powdered iron oxide, powdered carbonaceous material, and powdered fluxing material, the amount of carbon being sufficient to reduce 100% of the iron oxide to free metal. The powdered mixture is then formed into pellets having an average diameter in the range of ⅜ of an inch to 1.5 inch. For this step conventional pelletizing means and techniques may be used. The green or moist pellets are charged on a traveling grate machine to a depth of from 3 inches to 20 inches to form a bed of moist pellets. This bed is then dried by passing recycled gases through the bed at a temperature of from about 300° F. to about 600° F. After the moisture content of the pellets has been reduced to less than about 2%, the burden is heated by passing preheated gases through the bed to raise the temperature of the bed to between 1000° F. and 2000° F., the gases being substantially non-reactive with the carbonaceous material and the iron oxide. Finally, the burden is submitted to a heat soaking process to metallize the pellets. Metallization is accomplished by passing substantially inert gases through a bed to raise the temperature thereof to a maximum of about 2400° F. for a period of time sufficient to reduce from 60% to about 90% of the iron in the pellet to metallic iron. The gas medium which is used in this process is preferably oxygen-depleted air. By oxygen-depleted air, it is meant that the air contains no more than 15% oxygen by weight and preferably no more than 10% oxygen by weight. Of course, it will be understood that relatively inactive gases such as nitrogen or carbon dioxide, or mixtures thereof may be used in place of air. However, the economics of the process are adversely affected by such a substitution although the effectiveness of the process might even be improved. To the extent that the gases should be substantially non-oxidizing, they should also be substantially non-reducing. That is, the gases should contain no more than about 10% by weight of carbon monoxide.

It has been found convenient to effect preheating of the gases by burning combustible gas in the draft stream prior to its entry into the bed or burden. Such burning of combustible gas effects reduction of the oxygen content to within the permissible range for what is termed herein a "substantially inert gas." Likewise, the gases which exit from the burden or bed are rich in carbon monoxide and hydrocarbon matter from pyrolytic decomposition of coal. To insure that the gases are conveniently handled and do not become highly reducing, it is desirable to pass the gases through an after-burner whereby the heat values in the carbon monoxide and hydrocarbon or volatile combustible content may be utilized to preheat the gas and at the same time control the neutrality of the gas stream and maintain it substantially inert.

Figure 1:
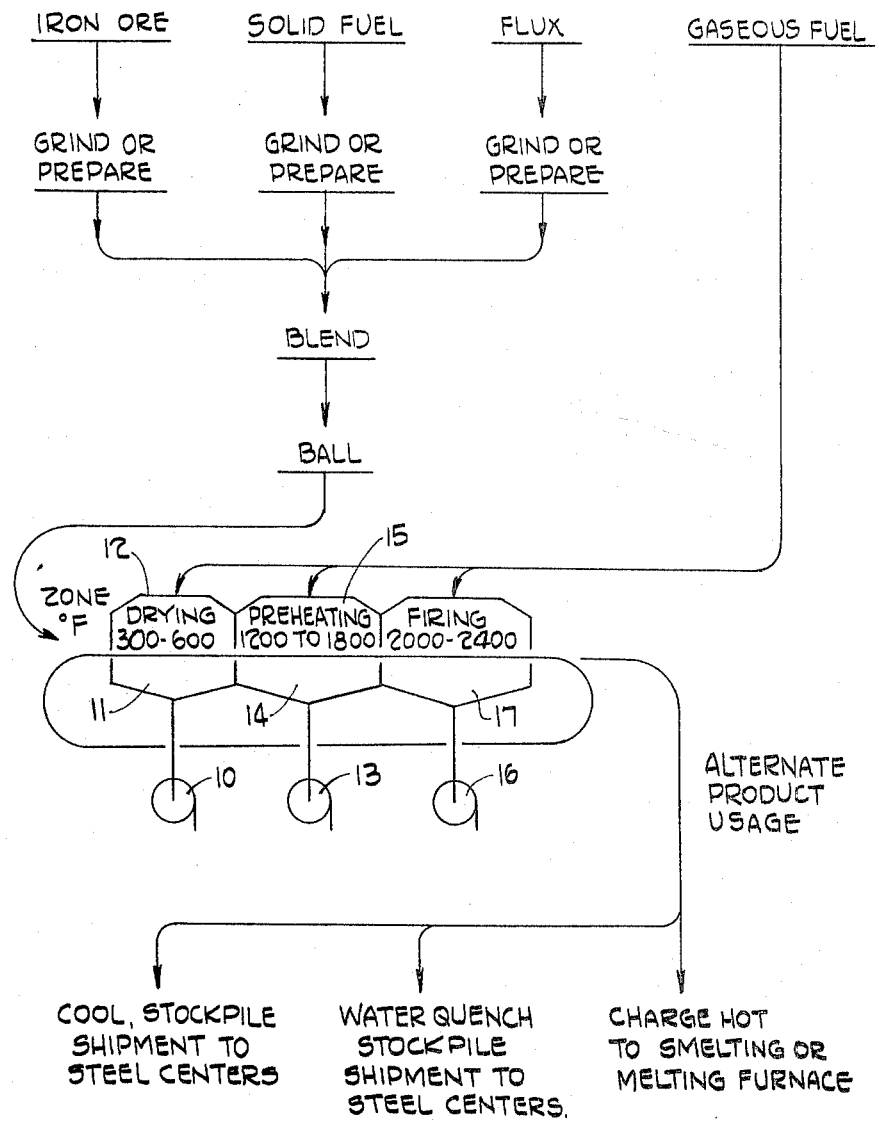
FIG. 1 is a simplified flow sheet for producing highly metallized pellets.

Referring now more particularly to the flow sheet of FIG. 1, the raw materials introduced into this process include iron ore, a solid carbonaceous fuel, and a fluxing material. As indicated above, a gaseous fuel is also employed for preheating and utilizing the draft streams.

The several ingredients are ground and blended to produce a granular mix, the particle sizes being that which is suitable for balling, and generally in the range of from about −325 mesh to about 10 mesh, preferably about from 48 mesh to 100 mesh (Tyler). The materials are prepared so that the blend is substantially −10 mesh and contains approximately 80% −100 mesh, with approximately 50% being −325 mesh. Individual size analyses of raw materials are not critical, and it is the physical composition of the blend which enables proper balling characteristics.

The iron ore utilized in accordance with this process may be any of the commercially available ore materials. The present process is particularly suited for the beneficiated Taconite ore, and is particularly useful in conjunction with the prepared low grade iron ores. To prepare the iron ore for this process, it is pulverized to a fineness within the range of from about 100 mesh to about 200 mesh as practical limits. Finer subdivision of the iron ore may, of course, be practiced but at the sacrifice of economics of the process.

The solid carbon-containing material useful in accordance with this invention is desirably a naturally occurring carbonaceous material. However, any carbon fuel such as coke, coke breeze, anthracite coal, bituminous coal, lignite, or the like may be used. A solid carbonaceous material is desirably pulverized to the same fineness as the iron ore although it may be considerably coarser, e.g. 6 to 65 mesh. The fluxing material is principally limestone. Other fluxing materials conventionally employed in iron making processes may also be included with the fluxing material as will be understood by those skilled in the art. For illustrative purposes, the present invention will concern those with limestone as the fluxing material, it being understood that other materials may be substituted therefor or admixed therewith. The fluxing material is likewise pulverized to within the same particle size range as the other materials.

In general, the relative amount of carbon employed in these compositions is determined by the amount of reduction and hardening which is necessary to be carried out by the carbonaceous material. The carbonaceous material should contain free carbon and supply available carbon in an amount at least sufficient to convert all the iron oxide to metallic iron and provide the desired carbon content in the final pig iron, e.g. 3.5% C. A practical mode of computing the amount of carbonaceous material assumes that the available carbon reacts with the iron oxide to yield carbon monoxide instead of $CO_2$ or a mixture of $CO_2$ and CO. It is further assumed that only the fixed carbon content of the carbonaceous material undergoes reaction or is available therefor. A certain amount of the fixed carbon content is lost and assumed to be about 20%. Thus when the available carbon in the carbonaceous material is calculated and this stoichiometrically calculated against the iron ore for reduction to elemental iron, the amount so calculated is multiplied by 1.2 to account for losses of fixed carbon. The result divided by the percentage of fixed carbon in the carbonaceous material yields the amount of such material to be employed in a given formulation. Common materials contain about 55% fixed carbon. Ordinarily, from 25% to 50% by weight of the entire mixture of carbonaceous material is sufficient for this purpose, and most usually about 30% by weight.

Better metal bonding is secured in the final discrete metallized pellets if the carbonaceous material has a relatively coarse particle size, i.e. 6 to 65 mesh. It has been found that with more finely divided carbonaceous materials there is some tendency to form a protective coating of carbon around the metal and thus inhibit metal bonding.

The amount of fluxing material again is dependent in large measure on the extent of impurities which should be scavenged by the slag. Ordinarily, from 5% to 15% by weight of the composition is the fluxing material. The balance of the composition is the iron ore. It will, of course, be understood that the iron ore may contain as it naturally occurs certain proportions of limestone and other fluxing materials for which allowance is made in the preparation of the puulverized mixtures.

A typical pig iron produced in accordance herewith analyzes 3.5% C; 1.0% Si; and 95.5% Fe.

As indicated in the flow sheet, several pulverized ingredients are carefully blended to produce a uniform mixture.

A typical example of a composition on the dry basis for the burden is as follows:

| | Percent |
|---|---|
| Iron ore | 53 |
| Powdered non-coking coal | 30 |
| Limestone | 11 |
| Silica sand | 6 |

Following the blending step, the mixture is submitted to a balling operation, such operation being well known and conventionally practiced utilizing conventional balling or pelletizing machines. As those skilled in the art are well aware, there may be used for this purpose pelletizing drums or inclined pans; for the purposes of this invention the inclined pelletizing pan is preferred. Moisture is added to the composition as it enters the pan, and by controlling the rate of rotation of the pan, the moisture content, and the angle of inclination of the pan, the particle size of the pellets can be easily controlled and rendered remarkably uniform. Firm discrete green pellets are formed at a moisture content of from about 10% to 15% water. The particle size is, as indicated, quite uniform, and for the purposes of this invention may range from ⅜ of an inch average diameter to 1.5 inches average diameter. The term "green balls" or "green pellets" as used herein refers to the fact that the pellets or balls have not been dried or indurated and identifies their moist condition upon leaving the balling apparatus.

The green pellets are discharged from the apparatus and conveyed to a conventional traveling grate machine to provide a burden depth of from 3 inches to 20 inches.

As is well known by those skilled in the art, the Dwight-Lloyd traveling grate machine includes an elongated trackway having supported thereon on wheels a plurality of individual traveling pallets each having a bottom formed of a plurality of grate bars and upstanding side walls. When the traveling grate members are progressing along a level portion of the trackway, they form a continuous channel and traveling grate. At the discharge extremity of the level portion the individual pallets are carried by a curved guide member to a return trackway in an inverted position and returned by the opposite sprocket member at the discharge extremity to the normal upright position to repeat the cycle. The elongated straight portion of the trackway is provided with contiguous hood portions surmounting the traveling pallets for the admission or removal of gases to or from the upper surface of the burden carried on the pallets in coacting relation. Beneath the pallets and the burden are a plurality of contiguous wind boxes likewise adapted for the admission of gaseous material to or withdrawal of gaseous material from the burden.

As indicated above, the pelletized green balls are charged to the traveling grates of such a traveling grate machine to a depth which may range from about 3 inches to about 20 inches. Bed depth is also dependent upon the drying conditions, i.e. temperature, humidity, and gas flow rate, and the necessity for avoiding recondensation or concentration of moisture at the surface of the bed adjacent the exit of the moisture laden gases from the bed, usually the bottom surface where downdraft drying is used. The more inert and drier the gas, the deeper the bed can be. Burden depths of about 12 inches have been used most satisfactorily. The width of the pallets may be any convenient width for example from 18 inches to 72 inches.

As schematically shown in the flow sheet of FIG. 1, the burden enters a drying zone where substantially inert gases at a temperature of from about 300° F. to 600° F. are passed downwardly through the burden. A fan 10 coacting with windbox 11 opposite the drying hood 12 exhausts the moisture laden gases to the atmosphere.

The burden then passes into a preheating zone where the incoming gases have a temperature in the range of from 1000° F. to about 2000° F. A fan 13 coacting with windbox 14 and hood 15 is adapted to draw the preheated substantially inert gases downwardly through the burden. Instead of discharging these gases to the atmosphere, these gases contain a substantial proportion of hydrocarbons and carbon monoxide which may be utilized in an after-burner as shown in later figures to impart heat to the gases for recycling. The after-burner also serves to rid the gas stream of tars which otherwise tend to accumulate in the fans necessitating costly shut downs to clean out the fans, or if the oxygen content of the gas reaches a sufficient level the accumulated tars will burn and destroy the fan housing.

Finally, the pellets enter a heat soaking zone where the incoming gases have a temperature in the range of from about 2000° F. to about 2400° F. Fan means 16 coacting with windbox 17 serve to propel the gases through the burden.

The discharge from the machine may, as indicated in FIG. 1, be cooled and stockpiled for subsequent shipment to steel making centers. Alternatively, the metalized pellets may be water quenched, stockpiled and subsequently shipped to steel making centers. Still alternatively, the hot highly metallized pellets may be charged directly to a smelting or melting furnace, such as an electric arc furnace. These pellets contain up to 2% free carbon, and the bond holding the pellet together is largely metallic iron with or without some ceramic bond resulting from fusion of metallic oxides in the pellet.

Figure 2:
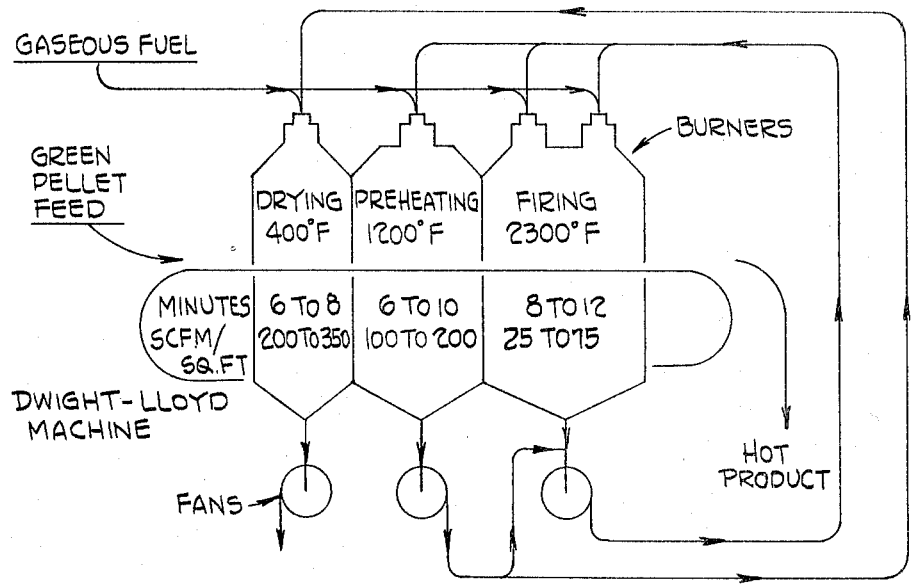
FIG. 2 illustrates in diagrammatic form the conditions and set up of a conventional traveling grate machine for producing hot metallized pellets.

Referring now more particularly to FIGS. 2 and 3, there are here shown the temperature and gas volume conditions, and the gas flow patterns in typical examples of the present invention. In FIG. 2, the traveling grate machine is especially adapted for the production of a hot product which is conveniently discharged directly into an electric furnace for the production of metallic pig iron. The gases are passed downwardly through the pellet burden. Gaseous fuel is burned in the gas line to produce a substantially neutral gas. This gas, admixed with recycle gases which have previously been cooled is admitted in part to the drying zone at a temperature of 400° F. A burden 12 inches deep is retained in the zone for a period of from about 6 to 8 minutes, and the gases are forced downwardly through the burden at a rate of from about 200 to about 350 standard cubic feet per minute per square foot (s.c.f.m./sq. ft.). The exhaust from this zone is vented to the atmosphere by a fan as indicated.

A further portion of the gaseous fuel is introduced together with recycle fuels into the reheating preheating or carbonizing zone at a temperature of 1200° F. The burden is retained in this zone for a period of 6 to 10 minutes and the hot gases passed downwardly therethrough at a rate of from 100 s.c.f.m./sq. ft. to 200 s.c.f.m./sq. ft. Finally, the burden enters a firing zone where the hot gases are introduced at a temperature of 2300° F. The pellets are retained in this zone for a period of from 8 to 12 minutes, and the gases are passed downwardly through the burden at from 25 s.c.f.m./sq. ft. to 75 s.c.f.m./sq. ft. The pallets progress through the machine at a constant predetermined rate which depends on the length of a given zone and the desired contact or retention time in a given zone. The length of a given zone on a traveling grate machine may be adjusted by proper selection of the hood and windbox lengths. Thus, in one installation, the drying zone length is about 20% of the length of level pallet travel, the carbonizing zone, about 45%, and the firing zone about 35%.

The gases issuing from the preheating zone and the firing zones may be co-mingled and passed through afterburner where carbon monoxide hydrocarbon is ignited, the exothermic nature of this reaction supplying heat to the gas stream. The ignited gases may be then recycled to either or both of the preheating and firing zones where fresh hot gases may be blended therewith to provide the desired temperature. When the gases are recycled to the drying zones, it may be desirable to include a cooling tower in the line to effect temperature reduction of the gases to the desired 400° F. level.

In FIG. 3 there has been shown a similar set-up for the traveling grate machine illustrating another specific example particularly adapted for the production of cold product. In this instance, gases are downwardly drawn through the drying, preheating and a portion of the firing zone at the temperatures and under the conditions set forth in FIG. 2. Gases from the drying and preheating zone are preferably passed through a cooling tower and either exhausted or recycled to a terminal downdraft cooling zone at the end of the apparatus. In this embodiment, the firing zone is divided into a downdraft region and an updraft region, the latter being about ⅓ of the total firing zone. In the firing and soaking zone an extensive metallization of the chemically combined iron in the ore takes place. The updraft gases are cooled moist substantially inert gases recycled from the drying and preheating zones and effecting a reduction in temperature of the burden to about 1200° F. as the cooled gases emerge from the upper surface of the burden, the gases gaining in sensible heat, by extracting heat from the burden. These gases are permitted to blend with the gases being downwardly drawn through the burden in the firing zone, there withdrawn by fan 20 through after-burner 21, and recycled to the preheating and firing zone as indicated in the diagram. As previously indicated, air from the drying and preheating zone, which may be tempered with ambient air, is forced through the burden downwardly in the terminal portion. The retention times in the firing and soaking zone range from about 10 to about 20 minutes, and the rate of flow through such zone is from about 25 s.c.f.m./sq. ft. to about 75 s.c.f.m./sq. ft. In the cooling zone the pellets are retained for a period of about 10 minutes, and the gas flow is in the range of from about 100 s.c.f.m./sq. ft. to about 150 s.c.f.m./sq. ft. The process of FIG. 3 produces a cold product.

FIG. 4 is a diagrammatic simplified illustration of another example of the conditions of operation embodying the present invention. In this case, the moist green pellets are charged to a conventional traveling grate machine to a bed depth of about 12 inches, and enter first a drying zone wherein the burden is subjected to a downdraft of drying gases at a temperature of about 400° F. for a period of 8 minutes and at a flow rate of 200 s.c.f.m./sq. ft. The gases exiting from this zone are exhausted by means of fan 30 to the atmosphere.

The burden then passes into a carbonizing zone where the gases enter at about 1000° F. The carbonizing zone is a compound zone having a downdraft portion 31 and an updraft portion 32. The hot gases which are recycled are passed downwardly through the burden for a period of 12 minutes' exposure at a rate of about 150 s.c.f.m./sq. ft. In order to assure uniformity of carbonizing and prereduction to metal, the burden then enters an updraft section or zone where it is submitted to recycle gases forced upwardly through the burden by means of fan 33. The exposure time in this latter zone is approximately 5 minutes and the rate of flow is 50 s.c.f.m./sq. ft. The gases issuing from the upper surface of the burden are reversed by the hood 34 and drawn downwardly along with the recycle gases by means of fan 35. The gases are rich in carbon monoxide and hydrocarbons at this point and enter after-burner 36 where the gases are ignited by bleeding-in air or by means of an initiator gas torch. By such after-burner, the heat content of the gases is increased. Regulation of the temperature may be effected by means of air bleed-in at 37. As indicated above, the gases are recycled and divided, a portion entering the drying zone, and another portion entering the carbonizing zone at 38. Fresh hot gas is conveniently blended with the recycled gases at the point of entry 38.

The gases passing through the updraft section may be ambient air, or as shown in dotted lines 39, a portion of the recycle gases from the after-burner 36.

Following the carbonizing zone, the burden then passing into a metallizing zone where the temperature is maintained within the range of 1800° F. to a maximum of 2400° F. Burners may be added at 40 to improve the heat content of the entering gases to effect the temperature range within the metallizing zone 41 as indicated. The retention time in the metallizing zone 41 is from 7 to 18 minutes, and the rate at which the gas is passed through the bed in a downdraft direction is from 25 s.c.f.m./sq. ft. to 75 s.c.f.m./sq. ft. The gases are drawn downwardly through the burden by means of fan 42, and the stream may be split at 43 for partial cooling in cooling tower 44 or the stream may be by-passed through by-pass 45 and recycled to the metallizing zone 41 as indicated. Additional hot gases may be introduced at 46. Following the metallizing zone, the hot burden may be discharged directly into a smelting furnace, e.g. electric arc furnace, or may be subjected to a cooling zone such as indicated in FIG. 3. Alternatively, the hot burden may be water quenched and stockpiled.

Solid carbonaceous materials have been designated as primary sources of reductant within the pellets, and these are usually provided in an intimate and subdivided state with the iron oxide materials in the pellet. Heat can be applied through external sources along with minor amounts from the pellet sources in burning part of the carbon content of the pellet for supporting the endothermic reactions of the reduction caused by the solid materials. Many sources of solid carbonaceous material may be applied for these purposes and specific materials found useful are as follows: coking bituminous coals, non-coking bituminous coals, subbituminous coals and lignite, anthracite coal, coke, charcoal and tar-like asphaltic residues.

Frequently blends of these ingredients can be considered as sources of solid carbonaceous material for the purposes of this invention. It has been found that the processing systems illustrated with FIGURES 1, 2, 3 and 4 respond to treatment using carbonaceous materials possessing mild coking indices such as the mild coking coals containing approximately 10% asphaltic residues. The use of totally non-coking materials such as anthracite, chars, and coke breeze, and lignite are most appropriately applied in the flowsheet systems illustrated in FIGURES 1 and 2. Furthermore, it has been found beneficial to use relatively coarse size reductant materials in these processes such as those with a structure of minus 6 mesh plus 65 mesh wherein bonding of the iron containing materials is not impeded by smaller particles of carbonaceous matter which does not form a char bond.

In order to prepare the pellets more suitably for direct introduction into a cupola type furnace or a blast furnace, it is desirable to increase the carbonaceous material content from about 10% to about 20%. Conveniently this is done by rerolling the green pellets with powdered coal or other carbonaceous material until they have gained from about 10% to about 20% by weight. Alternatively, in a second apparatus, coal pellets may be formed having the same or substantially the same particle size as the iron ore composition pellets above described. Instead of forming carbonaceous pellets, sized coal or other carbonaceous material may be added directly to the pellet burden. Then, the carbonaceous pellets and the iron ore pellets are blended prior to introduction into the traveling grate machine so as to provide an excess carbonaceous matter content in the burden of about 10% to about 20% by weight. When treated in this manner, the carbonaceous pellets form a coke-like char, a desired ingredient for use in the pig iron producing apparatus. Accordingly, the entire charge may be introduced into the furnace without further addition. In addition to providing a sufficient amount of carbon to complete the reduction in an iron making furnace, the excess carbon aids in the reduction on the machine to form the highly metallized pellets.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A process for making highly metallized pellets, comprising the steps of:
   (a) forming a mixture of fines of iron ore, a carbonaceous material, and a fluxing material, the carbonaceous material containing available carbon in amount sufficient to reduce 100% of the iron oxide in said ore to free metal,
   (b) forming moistened pellets of said mixture having an average diameter of about —1.5 inch, +⅜ inch,
   (c) charging said moistened pellets on an endless conveyor at a depth of from 3 to 20 inches, to form a burden of moist pellets,
   (d) drying said burden by passing substantially neutral gases ranging in temperature from 300° F. to 600° F. through the burden,
   (e) heating said burden by passing preheated, non-reactive gases containing not more than 15% of oxygen, by weight, through the burden to raise its temperature to between 1000° F., and 2000° F. and
   (f) subsequently heat-soaking and metallizing said burden by passing non-reactive gases containing not more than 15% of oxygen, by weight, through the burden to raise its temperature to a maximum of 2400° F., for a period of time sufficient to reduce from 60% to no more than 90% of the chemically-combined iron in said mixture to metallic iron and form metallized pellets.

2. The process of claim 1, wherein the neutral gases for drying the burden includes, substantially non-oxidizing and non-reducing gases containing not more than 10% of carbon monoxide by weight.

3. The process of claim 2, which includes the step of:
   (g) cooling said metallized pellets by passing cooled substantially non-oxidizing and non-reducing gases containing not more than 10% of carbon monoxide, by weight, through the metallized pellets.

4. The process of claim 2, which includes the step of:
   (h) charging said heat-soaked and metallized pellets to a furnace to complete the reduction of the iron ore to metallic iron.

5. The process of claim 2, which includes the step of:
   (i) increasing the content of carbonaceous material from 10% to 20% by weight of moist pellets, after said moistened pellets have been formed.

6. The process of claim 5, in which the carbon content is increased by rerolling the iron ore pellets with powdered carbonaceous material.

7. The process of claim 5, in which the carbon content is increased by forming separate discrete pellets of powdered carbonaceous material, and blending them with the iron ore pellets to the extent of from 10% to 20% by weight.

References Cited by the Examiner

UNITED STATES PATENTS

| | | | |
|---|---|---|---|
| 2,190,493 | 2/1940 | Stehli | 75—5 |
| 2,696,432 | 12/1954 | Davis | 75—5 |
| 2,750,274 | 6/1956 | Lellep | 75—5 |
| 2,758,919 | 8/1956 | De Vaney et al. | 75—5 |
| 2,805,141 | 9/1957 | Apuli | 75—5 |
| 2,806,779 | 9/1957 | Case | 75—4 |
| 3,020,147 | 2/1962 | Boss et al. | 75—5 |
| 3,024,101 | 3/1962 | Erck et al. | 75—5 |
| 3,057,715 | 10/1962 | Stapleton | 75—5 |
| 3,093,474 | 6/1963 | Collin | 75—3 |
| 3,097,090 | 7/1963 | Aamot | 75—33 |

FOREIGN PATENTS

| | | |
|---|---|---|
| 600,026 | 6/1960 | Canada. |
| 835,329 | 5/1960 | Great Britain. |

BENJAMIN HENKIN, *Primary Examiner.*